United States Patent
Tucker

(10) Patent No.: US 12,034,339 B2
(45) Date of Patent: Jul. 9, 2024

(54) LAMINATED ROTOR HAVING DEFLECTING MAGNET RETAINING PRONGS DEFLECTING WHEN INSERTING MAGNETS IN AXIAL DIRECTIONS AND SUPPORT POSTS WITH CONSTANT WIDTH

(71) Applicant: Nidec Motor Corporation, St. Louis, MO (US)

(72) Inventor: John M. Tucker, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 18/307,854

(22) Filed: Apr. 27, 2023

(65) Prior Publication Data
US 2024/0079920 A1    Mar. 7, 2024

Related U.S. Application Data

(63) Continuation of application No. 17/575,688, filed on Jan. 14, 2022, now Pat. No. 11,670,976, which is a continuation of application No. 16/562,113, filed on Sep. 5, 2019, now Pat. No. 11,264,850.

(51) Int. Cl.
    H02K 1/27      (2022.01)
    H02K 1/278     (2022.01)

(52) U.S. Cl.
    CPC ................... *H02K 1/278* (2013.01)

(58) Field of Classification Search
    CPC .......... H02K 1/278; H02K 1/27; H02K 1/274; H02K 1/2746; H02K 1/2753; H02K 1/276

USPC ............ 310/156.55, 156.08, 156.12, 156.19, 310/156.47, 156.56, 156.72
See application file for complete search history.

(56) References Cited

U.S. PATENT DOCUMENTS

| | | | | |
|---|---|---|---|---|
| 4,126,933 A | * | 11/1978 | Anderson | H02K 15/03 310/43 |
| 4,314,692 A | * | 2/1982 | Brauer | E05F 15/697 254/362 |
| 4,531,071 A | * | 7/1985 | Kintz, Jr. | H02K 1/276 310/156.28 |
| 4,580,072 A | * | 4/1986 | Morishita | H02K 1/17 310/154.26 |
| 4,585,964 A | * | 4/1986 | Hildebrandt | H02K 3/50 310/68 E |

(Continued)

*Primary Examiner* — Maged M Almawri
(74) *Attorney, Agent, or Firm* — Hovey Williams LLP

(57) ABSTRACT

A rotor assembly for an electric machine includes a rotor core that is fabricated from a plurality of laminations stacked along a rotational axis of the electric machine. The rotor core has a plurality of arcuately arranged, axially extending magnet-receiving slots. The rotor core includes a plurality of magnets received in respective ones of the magnet-receiving slots. Each of the laminations includes opposed deflectable magnet-retaining prongs that extend into a corresponding one of the magnet-receiving slots. The magnet-retaining prongs are deflected by and engage the magnets to exert a reactive force against the magnets and hold them in place. Each of the laminations also includes respective support posts axially adjacent the magnet-retaining prongs. The support posts extend alongside and thereby limit the deflection of the magnet-retaining prongs when engaged with the corresponding one of the magnets.

20 Claims, 12 Drawing Sheets

(56) References Cited

U.S. PATENT DOCUMENTS

| | | | | |
|---|---|---|---|---|
| 4,587,449 A * | 5/1986 | West | H02K 23/04 | 310/154.15 |
| 4,594,525 A * | 6/1986 | Stokes | H02K 1/278 | 310/43 |
| 4,625,392 A * | 12/1986 | Stokes | H02K 1/278 | 29/598 |
| 4,631,435 A * | 12/1986 | McCarty | H02K 1/278 | 310/156.57 |
| 4,689,973 A * | 9/1987 | Hershberger | D06F 37/304 | 68/23.7 |
| 4,700,096 A * | 10/1987 | Epars | H02K 1/2773 | 310/156.61 |
| 4,757,603 A * | 7/1988 | Stokes | H02K 1/27 | 310/43 |
| 4,845,837 A * | 7/1989 | Lloyd | H02K 1/276 | 310/43 |
| 4,881,001 A * | 11/1989 | Patel | H02K 1/185 | 310/216.052 |
| 4,939,398 A * | 7/1990 | Lloyd | H02K 15/03 | 310/43 |
| 5,015,902 A * | 5/1991 | Leitgeb | H02K 21/46 | 310/156.01 |
| 5,220,233 A * | 6/1993 | Birch | H02K 1/2733 | 310/156.28 |
| 5,237,737 A * | 8/1993 | Zigler | H01F 41/0253 | 310/156.28 |
| 5,345,669 A * | 9/1994 | Zigler | H01F 41/0253 | 310/156.28 |
| 5,489,810 A * | 2/1996 | Ferreira | H02K 1/32 | 310/58 |
| 5,523,635 A * | 6/1996 | Ferreira | H02K 1/32 | 310/71 |
| 5,640,064 A * | 6/1997 | Boyd, Jr. | H02K 11/40 | 310/216.069 |
| 5,650,680 A * | 7/1997 | Chula | H02K 3/16 | 310/216.123 |
| 5,659,217 A * | 8/1997 | Petersen | H02K 29/08 | 310/156.26 |
| 5,668,425 A * | 9/1997 | Marioni | H02K 7/118 | 310/78 |
| 5,668,429 A * | 9/1997 | Boyd, Jr. | H02K 11/40 | 310/179 |
| 5,677,582 A * | 10/1997 | Lutz | B60K 17/12 | 310/113 |
| 5,747,913 A * | 5/1998 | Amlee | H02K 21/044 | 310/263 |
| 5,763,973 A * | 6/1998 | Cramer | F04D 13/025 | 310/85 |
| 5,770,900 A * | 6/1998 | Sato | H02K 3/525 | 310/43 |
| 5,773,910 A * | 6/1998 | Lange | H02K 1/27 | 310/90 |
| 5,780,951 A * | 7/1998 | Stephens | H02K 1/148 | 310/40 MM |
| 5,798,596 A * | 8/1998 | Lordo | H02K 1/278 | 310/156.45 |
| 5,852,338 A * | 12/1998 | Boyd, Jr. | H02K 17/30 | 310/90 |
| 5,898,990 A * | 5/1999 | Henry | H02K 15/03 | 29/598 |
| 5,911,453 A * | 6/1999 | Boyd, Jr. | H02K 11/25 | 29/609 |
| 5,952,755 A * | 9/1999 | Lubas | H02K 1/2773 | 310/156.19 |
| 6,039,827 A * | 3/2000 | Cramer | F04D 13/025 | 156/169 |
| 6,040,650 A * | 3/2000 | Rao | H02K 3/00 | 310/268 |
| 6,075,306 A * | 6/2000 | Mosciatti | H02K 1/28 | 310/156.12 |
| 6,144,131 A * | 11/2000 | Hollenbeck | H02K 7/04 | 310/156.53 |
| 6,275,319 B1 * | 8/2001 | Gadhok | H02K 33/00 | 359/198.1 |
| 6,323,572 B1 * | 11/2001 | Kinoshita | H02K 1/2791 | 310/156.55 |
| 6,376,956 B1 * | 4/2002 | Hosoya | H02K 1/17 | 310/156.19 |
| 6,437,473 B1 * | 8/2002 | Mobius | H02K 1/2766 | 29/598 |
| 6,465,925 B2 * | 10/2002 | Kako | H02K 1/17 | 310/156.16 |
| 6,732,986 B2 * | 5/2004 | Heidrich | H02K 1/278 | 248/683 |
| 6,933,645 B1 * | 8/2005 | Watson | H02K 1/2773 | 310/156.08 |
| 7,262,526 B2 * | 8/2007 | Shiga | H02K 1/2791 | 310/156.28 |
| 7,701,100 B2 * | 4/2010 | Morel | H02K 1/278 | 310/156.19 |
| 7,895,729 B2 * | 3/2011 | Longo | H02K 1/223 | 29/598 |
| 8,040,015 B2 * | 10/2011 | Zaps | H02K 1/278 | 29/598 |
| 8,138,650 B2 * | 3/2012 | Shiga | H02K 1/2791 | 29/598 |
| 8,203,249 B1 * | 6/2012 | Rao | H02K 3/42 | 310/260 |
| 8,232,703 B2 * | 7/2012 | Nakayama | H02K 1/2766 | 310/156.56 |
| 8,829,753 B2 * | 9/2014 | Maruyama | H02K 1/2753 | 310/156.19 |
| 9,106,118 B2 * | 8/2015 | Sugimoto | H02K 1/28 | |
| 9,112,393 B2 * | 8/2015 | Jayasoma | H02K 1/2781 | |
| 9,197,106 B2 * | 11/2015 | Clark | H02K 1/32 | |
| 9,306,422 B2 * | 4/2016 | Berkouk | H02K 1/06 | |
| 9,496,761 B2 * | 11/2016 | Haga | H02K 1/278 | |
| 9,570,949 B2 * | 2/2017 | Kamiya | H02K 1/278 | |
| 9,621,001 B2 * | 4/2017 | Kaiser | H02K 1/2766 | |
| 9,634,530 B2 * | 4/2017 | Klein | H02K 29/03 | |
| 9,847,704 B2 * | 12/2017 | Kaiser | H02K 15/03 | |
| 10,145,450 B2 * | 12/2018 | Moore | H02K 1/185 | |
| 10,312,757 B2 * | 6/2019 | Nishifukumoto | H02K 1/278 | |
| 10,491,067 B2 * | 11/2019 | Fraser | B60L 50/51 | |
| 10,833,569 B2 * | 11/2020 | Migita | H02K 15/0043 | |
| 10,840,756 B2 * | 11/2020 | Takizawa | H02K 5/04 | |
| 10,923,974 B2 * | 2/2021 | Migita | H02K 1/28 | |
| 10,985,623 B2 * | 4/2021 | Zhang | H02K 21/14 | |
| 2002/0063485 A1 * | 5/2002 | Lee | H02K 1/17 | 310/156.08 |
| 2002/0162939 A1 * | 11/2002 | Heidrich | H02K 1/278 | 248/683 |
| 2005/0017587 A1 * | 1/2005 | Koenig | H02K 1/278 | 310/156.19 |
| 2006/0103253 A1 * | 5/2006 | Shiga | H02K 15/03 | 310/43 |
| 2007/0210663 A1 * | 9/2007 | Kalavsky | H02K 1/30 | 310/156.19 |
| 2008/0048517 A1 * | 2/2008 | Ochiai | H02K 1/278 | 310/216.004 |
| 2008/0093945 A1 * | 4/2008 | Gruenhagen | H02K 1/278 | 310/156.19 |
| 2008/0157620 A1 * | 7/2008 | Longo | H02K 15/03 | 29/598 |
| 2008/0252166 A1 * | 10/2008 | Shiga | H02K 1/2791 | 29/598 |
| 2009/0001839 A1 * | 1/2009 | Masayuki | H02K 29/08 | 310/156.16 |
| 2009/0096314 A1 * | 4/2009 | Atarashi | H02K 16/02 | 310/156.53 |
| 2009/0261677 A1 * | 10/2009 | Ishikawa | H02K 1/278 | 29/598 |
| 2010/0045132 A1 * | 2/2010 | Zaps | H02K 15/03 | 310/156.21 |
| 2010/0213885 A1 * | 8/2010 | Ichiyama | H02K 21/12 | 310/156.46 |
| 2011/0260566 A1 * | 10/2011 | Odvarka | H02K 1/2796 | 29/598 |

(56) References Cited

U.S. PATENT DOCUMENTS

| | | | | |
|---|---|---|---|---|
| 2011/0285238 A1* | 11/2011 | Kusase | ................... | H02K 16/04 |
| | | | | 310/156.48 |
| 2012/0200187 A1* | 8/2012 | Sano | .................... | H02K 1/2766 |
| | | | | 310/156.07 |
| 2012/0228965 A1* | 9/2012 | Bang | ...................... | H02K 21/12 |
| | | | | 310/156.02 |
| 2012/0248916 A1* | 10/2012 | Clark | ..................... | H02K 1/278 |
| | | | | 310/156.12 |
| 2013/0093276 A1* | 4/2013 | Kim | ...................... | H02K 16/00 |
| | | | | 310/114 |
| 2013/0270955 A1* | 10/2013 | Lillington | ............... | H02K 21/22 |
| | | | | 29/598 |
| 2013/0307363 A1* | 11/2013 | Sano | .................... | H02K 1/2766 |
| | | | | 310/156.01 |
| 2014/0252892 A1* | 9/2014 | De Filippis | .......... | H02K 1/2773 |
| | | | | 29/598 |
| 2014/0265707 A1* | 9/2014 | Klein | ..................... | H02K 29/03 |
| | | | | 29/598 |
| 2015/0001978 A1* | 1/2015 | Haga | ...................... | H02K 1/274 |
| | | | | 310/156.12 |
| 2015/0108866 A1* | 4/2015 | Kaiser | .................. | H02K 1/2766 |
| | | | | 310/156.08 |
| 2017/0033625 A1* | 2/2017 | Haga | ...................... | H02K 1/2773 |
| 2017/0070108 A1* | 3/2017 | Gorton | ................... | H02K 15/03 |
| 2017/0317544 A1* | 11/2017 | Watanabe | ............... | H02K 1/276 |
| 2019/0063553 A1* | 2/2019 | Moore | .................. | H02K 5/1735 |
| 2021/0075278 A1* | 3/2021 | Tucker | ................... | H02K 1/278 |
| 2021/0242737 A1* | 8/2021 | Sherman | ............. | H02K 1/2773 |

* cited by examiner

LAMINATED ROTOR HAVING DEFLECTING MAGNET RETAINING PRONGS DEFLECTING WHEN INSERTING MAGNETS IN AXIAL DIRECTIONS AND SUPPORT POSTS WITH CONSTANT WIDTH

CROSS-REFERENCE TO RELATED APPLICATIONS

This is a continuation of U.S. patent application Ser. No. 17/575,688, filed Jan. 14, 2022, and titled LAMINATED ROTOR HAVING DEFLECTING MAGNET RETAINING PRONGS DEFLECTING WHEN INSERTING MAGNETS IN AN AXIAL DIRECTIONS AND SUPPORT POSTS WITH CONSTANT WIDTH, which was a continuation of U.S. patent application Ser. No. 16/562,113, filed Sep. 5, 2019, and titled LAMINATED ROTOR HAVING DEFLECTING MAGNET RETAINING PRONGS AND SUPPORT POSTS FOR THE PRONGS, the entireties of which are hereby incorporated by reference herein.

BACKGROUND

The embodiments described herein relate generally to a rotor assembly for an electric machine. More particularly, embodiments of the present invention concern rotor assemblies having laminated rotor cores with permanent magnets retained by the laminations.

Brushless Permanent Magnet (BPM) motors are often designed with individual magnets which must be attached along the surface of a rotating rotor core. This is often achieved through the application of high strength adhesive between the rotor core and magnets. However, in addition to the cost associated with adhesives, the presence of adhesives may introduce the problems of cure time and cleanup to an otherwise automatable assembly process.

It is known that many BPM rotors are constructed with multiple layers of thin steel, laminated together to form the rotor core. These individual layers (also known as laminations) are typically individually rotated by some degree prior to being assembled in order to prevent the inherent camber in each lamination from accumulating during assembly of the rotor.

Some known BPM rotors include laminations that have spring fingers integrated into the structure of each lamination of the rotor core. The pattern of spring fingers is such that every other lamination is identical, with the pattern repeating every two lamination layers. By axially inserting magnets between these spring fingers, the mechanical interference between the fingers and magnets retains the magnets to the rotor via friction. However, such laminated rotors are susceptible to manufacturing variation in the size of the laminations and magnets. The 50/50 nature of this solution (where every other layer is identical) may result in large interferences and high material deformation when magnets are oversized. Conversely such manufacturing may result in small interferences with some material deformation when magnets are undersized. The limited available space between adjacent magnets may limit the design space of these spring fingers as well as the space available for their deformation. This raises the possibility of manufacturing fallout in high volume production, and it also may cause difficulty in scaling this design (modifying the size) for new motor applications.

SUMMARY

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, a rotor assembly for an electric machine is provided. The rotor assembly includes a rotor core including a plurality of laminations stacked along a rotational axis of the electric machine. The rotor core defines a plurality of arcuately arranged, axially extending magnet-receiving slots. The rotor core also includes a plurality of magnets received in respective magnet-receiving slots. The laminations include opposed first and second deflectable magnet-retaining prongs that extend into a corresponding one of the magnet-receiving slots. The magnet-retaining prongs engage and are deflected by a corresponding one of the magnets to exert a reactive force against the corresponding one of the magnets therebetween. The laminations further include first and second support posts axially adjacent the first and second magnet-retaining prongs, respectively. Each of the support posts extend alongside and thereby limit deflection of the respective magnet-retaining prong when engaged with the corresponding one of the magnets.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
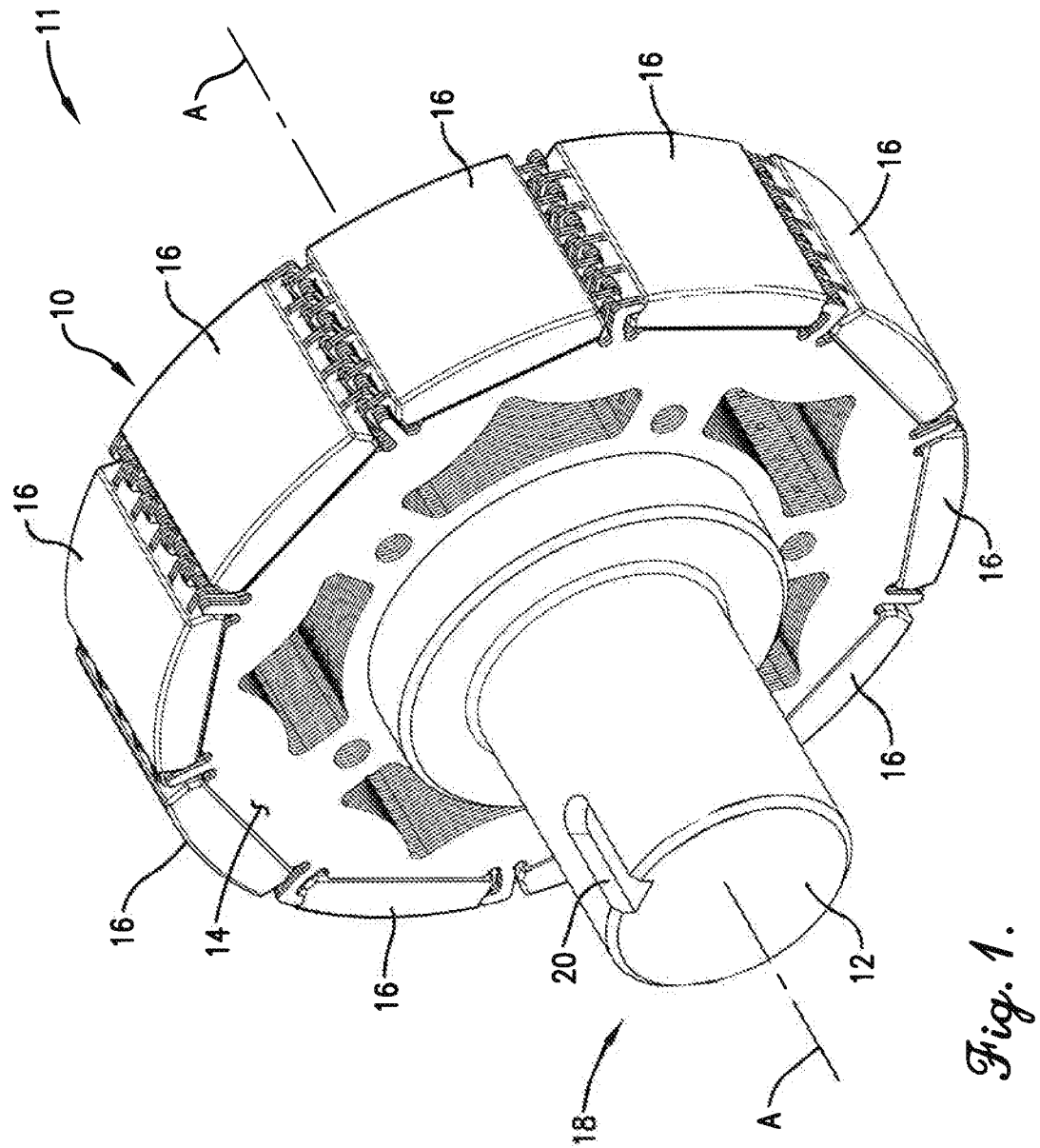
FIG. 1 is a perspective of an exemplary rotor assembly, constructed in accordance with one aspect of the invention.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, etc. described in one embodiment may also be included in other embodiments but is not necessarily included. Thus, the present technology can include a variety of combinations and/or integrations of the embodiments described herein.

In the following specification and the claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations extending substantially parallel to a longitudinal or rotational axis of the rotor assembly. The terms "radial" and "radially" refer to directions and orientations extending substantially perpendicular to the rotation axis of the rotor assembly. The terms "arcuate" and "arcuately" include directions and orientations extending around the rotation axis generally transverse to a radial direction of the rotor assembly, including tangential, circumferential, and curved orientations as defined herein. The terms "tangent" and "tangential" refer to the directions and orientations extending substantially perpendicular to a radial direction of the rotor assembly. In addition, as used herein, the terms "circumferential" and "circumferentially" refer to directions and orientations extending in the general direction in which a circle extends around the rotation axis of the rotor assembly (such references not being limited to the periphery or outer perimeter of the object unless the context clearly indicates otherwise). Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

Figure 2:
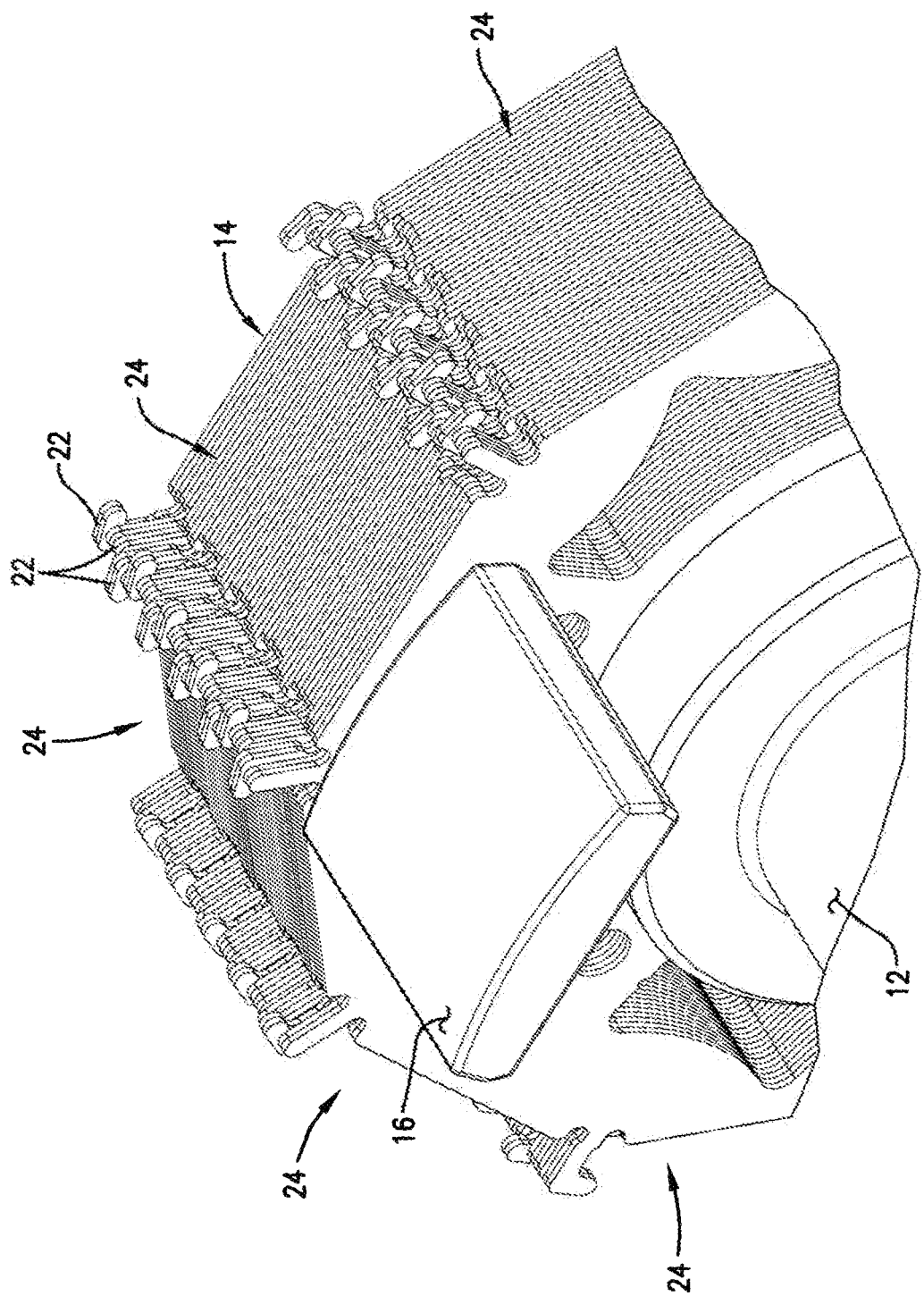
FIG. 2 is an enlarged view of a portion of the rotor assembly shown in FIG. 1, illustrating the insertion of a permanent magnet into a magnet slot of a rotor core.

FIG. 1 is a perspective view of an exemplary rotor assembly 10 of an electric motor 11, in accordance with one aspect of the present invention. FIG. 2 is an enlarged view of a portion of the rotor assembly shown in FIG. 1, illustrating the insertion of a permanent magnet 16 into an axially extending magnet-receiving slot 24 of the rotor core 14. In the exemplary embodiment, the rotor assembly 10 is illustrated as a brushless permanent magnet rotor assembly for use with the inner rotor electric motor 11. As will be described, an inner rotor motor has magnets positioned radially-inward relative to a stator (not shown). However, according to other aspects of the present invention, the rotor assembly 10 may alternately be constructed as an outer rotor assembly for use with an outer rotor motor and/or a dual rotor motor. In addition, the rotor assembly 10 may be constructed for use in an electric generator or other device electric machine that comprises a stator.

As shown in FIGS. 1 and 2, the illustrated rotor assembly 10 preferably includes a rotor shaft 12 fixedly supporting the rotor core 14. In one suitable embodiment, the rotor shaft 12 extends axially through the rotor core 14 and defines a rotation axis "A" of the rotor assembly 10. The rotor assembly 10 is substantially cylindrical in shape having an outside nominal diameter that is smaller than an inside diameter of an inner surface of the stator assembly (not shown) to enable rotation therein. As described herein, the rotor core 14 of the rotor assembly 10 is a permanent-magnet rotor core and includes a plurality of permanent magnets 16. In the exemplary embodiment, the rotor shaft 12 is fixedly coupled to the rotor core 14 and positioned concentrically relative thereto. The rotor shaft 12 includes a first end 18 that extends forward from the rotor core 14 and a shorter second end (not shown) that extends rearward from the rotor core 14. The first end 18 includes a keyway 20 defined therein, although, in some aspects of the present invention, the keyway 20 may be omitted. In the exemplary embodiment, the rotor core 14 and the magnets 16 are rigidly coupled together and are configured to rotate with the rotor shaft 12.

As described above, in the exemplary embodiment, the rotor assembly 10 is configured to rotate relative to the stator assembly (not shown). It is noted that the stator assembly may be fabricated as any suitable stator type and may include one or more electric windings configured to be electrically energized to generate an electromagnetic field. For example, and without limitation, the stator assembly may include a segmented core or an endless (non-segmented) toroidal core and may have various shapes. The stator assembly may be single-phase, three-phase, or different multi-phase stator assembly and can have any suitable number of slots. Furthermore, as described herein, the stator assembly may be configured for external or internal operation with the rotor assembly 10.

Figure 3:
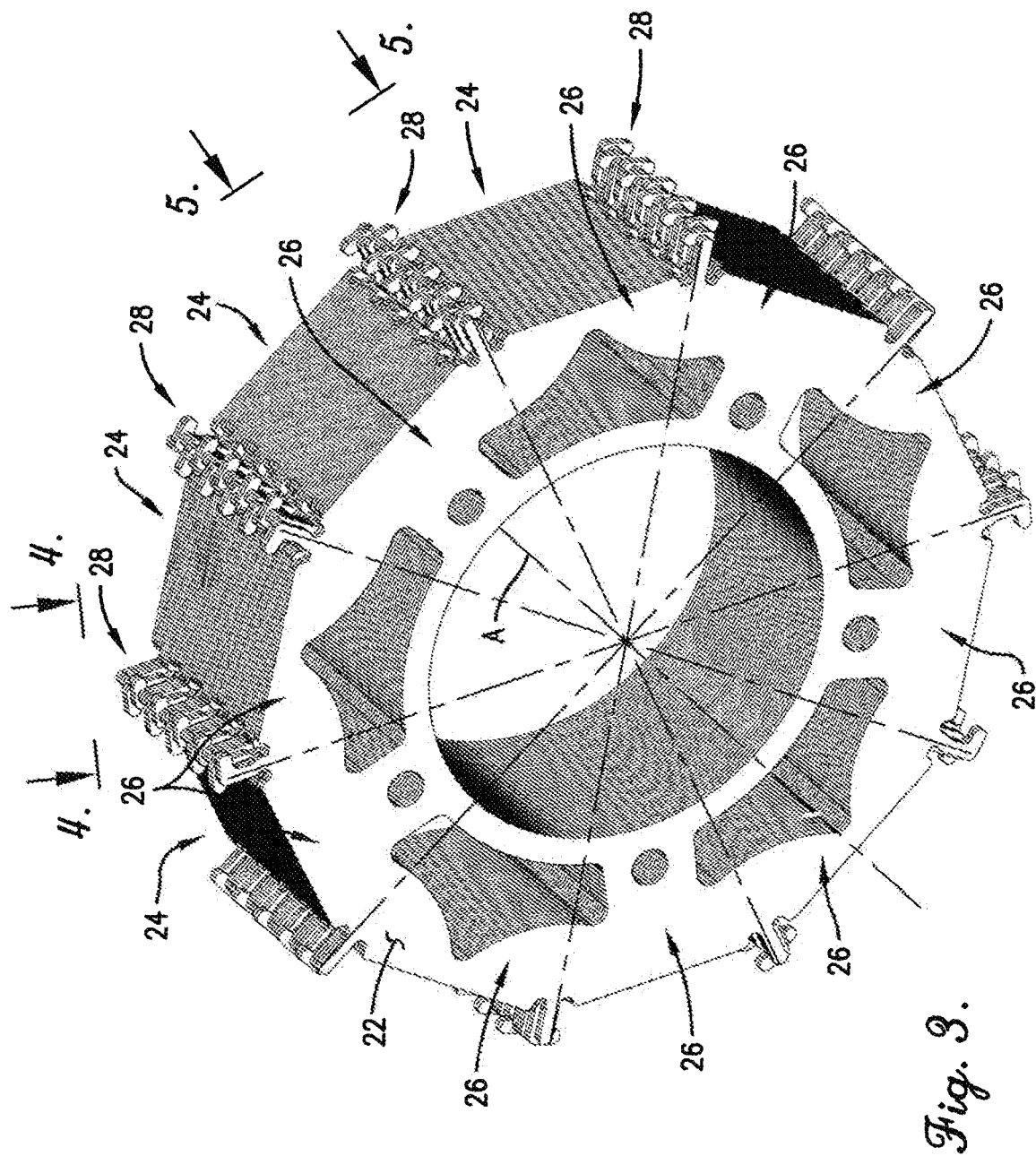
FIG. 3 is a perspective of the rotor core show in FIG. 2.

FIG. 3 is a perspective of the exemplary rotor core 14. In the exemplary embodiment, the rotor core 14 is fabricated from a plurality of laminations 22, each of which may be rotated or arcuately offset at various angles about the rotation axis "A." The laminations 22 are in the form of plates stacked or placed one on top of the other in face-to-face contact such that the rotor core 14 extends axially along the rotation axis "A" a predetermined length. As such, each lamination presents opposite axial faces, with one of the faces facing a first axial direction and the other facing the opposite axial direction. The plurality of laminations 22 may be interlocked (e.g., coupled to each other) or loose laminations. In the exemplary embodiment, each lamination 22 is fabricated (e.g., punched, stamped, machined, etc.) from a suitable sheet material, including, for example, and without limitation, a magnetically permeable material, such as iron, a steel, or a steel alloy. It is noted, that in various aspects of the present invention, the laminations may include laminations having different forms or may include laminations having substantially the same form.

In the exemplary embodiment, the rotor core 14 includes a plurality of arcuately arranged magnet-receiving slots 24 extending axially through the rotor core 14, where the slots 24 extend substantially parallel to the rotation axis "A." The magnet slots 24 are circumferentially positioned at substantially regular intervals about the rotation axis "A." Each of the magnet slots 24 is configured to receive at least one of the magnets 16 therein. As is described herein, each magnet slot 24 is positioned within a pole sector 26 of the rotor assembly 10. The illustrated embodiment includes ten (10) magnet slots 24, thus defining ten (10) rotor pole sectors 26. It is noted that in other aspects of the present invention, the rotor core 14 may include more or fewer pole sectors 26, depending on design requirements. It is also noted that the magnets 16 (e.g., shown in FIG. 1) are shown schematically for purposes of illustration but are generally sized to fit tightly within the magnet slots 24 to facilitate a secure, non-moving fit with the rotor core 14. Although the illustrated embodiment depicts a single magnet 16 extending substantially the full axial length of the corresponding magnet slot 24, aspects of the present invention contemplate multiple axially-arranged magnets 16 within each magnet slot 24.

Figure 4:
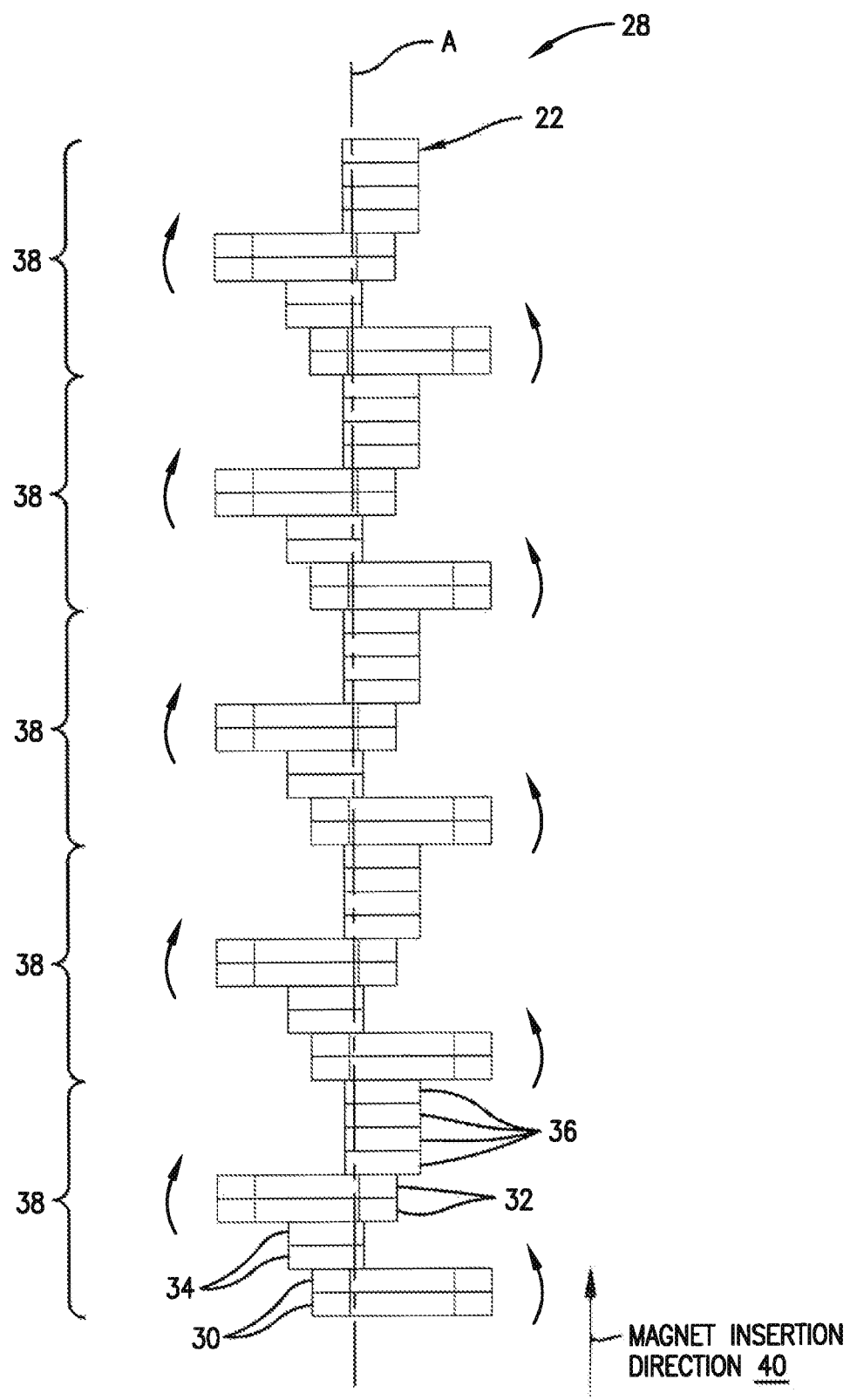
FIG. 4 is an enlarged view of a portion of the rotor core shown in FIG. 2, illustrating a magnet slot pattern of alternating deflectable magnet-retaining prongs and support posts, in accordance with one aspect of the present invention.

FIG. 4 is an enlarged view of a portion of the rotor core 14, illustrating a magnet slot pattern 28 of alternating deflectable magnet-retaining prongs 30 and 32 and support posts 34 and 36, in accordance with one aspect of the present invention. The view plane of FIG. 4 is oriented parallel to a flat, radially-outer surface 88 (shown in FIG. 7) of the deflectable magnet-retaining prongs 30 and 32 and looking radially-inward toward the rotation axis "A." As shown in FIG. 4, the magnet slot pattern 28 includes a plurality of repeating patterns 38. In the exemplary embodiment, each repeating pattern 38 is formed by a stack of ten (10) laminations, where each section of the pattern includes two (2) laminations. However, in other aspects of the present invention, the repeating patterns 38 can be formed from a stack of five (5) single laminations (see FIG. 6) or from lamination stacks that are multiples of five (5). For example, each section of the repeating pattern 38 can include three (3) or more laminations such that a repeating pattern 38 includes fifteen (15) total laminations.

In the exemplary embodiment, each repeating pattern 38 includes, in serial arrangement, a pair of first deflectable magnet-retaining prongs 30, a pair of first support posts 36, a pair of second deflectable magnet-retaining prongs 32, a first pair of second support posts 34, and a second pair of second support posts 34. However, in alternative aspects of the present invention, the second pair of second support posts 34 may be omitted. In such embodiments, each repeating pattern 38 would be formed by a stack of four (4) laminations and multiples thereof, as described above. It is noted that the repeating patterns 38, and as such, the magnet slot pattern 28, are directional. That is, as indicated in FIG. 4, the magnets 16 are inserted into each magnet slot 24 in a specified direction, as indicated by the arrow 40.

Figure 5:
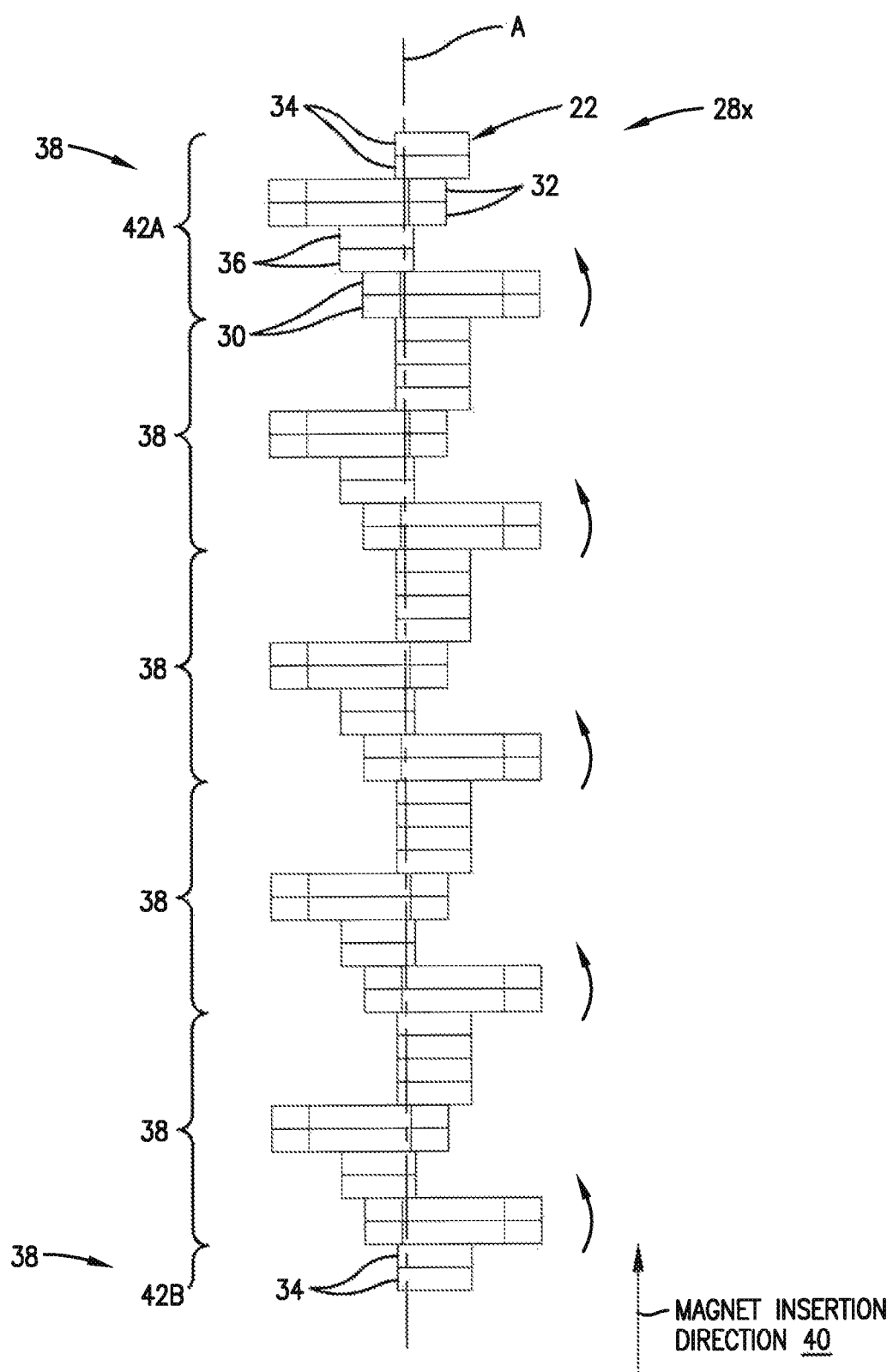
FIG. 5 is an enlarged view of a portion of the rotor core shown in FIG. 2, illustrating a "wrapped" magnet slot pattern of alternating deflectable magnet-retaining prongs and support posts.

In the exemplary embodiment, the general magnet slot pattern 28 can be described as being "wrapped" from one end to the other. For example, as shown in FIG. 3, different magnet slot patterns 28 may be "shifted" axially on the rotor core 14 along the rotation axis "A." As such, a repeating pattern 38 located at an end of a respective magnet slot pattern 28 may be "wrapped" around to the other end of the magnet slot pattern 28. For example, FIG. 5 is an example of a "wrapped" magnet slot pattern, indicated as a magnet slot pattern 28x, as compared to the magnet slot pattern 28 shown in FIG. 4. In this example, an end repeating pattern 38 is broken into two parts 42A and 42B, with the part 42A containing a first portion of a repeating pattern 38 (extending along the direction of the arrow 40) and the part 42B containing a second portion of the pattern that is "wrapped" around to the beginning of the magnet slot pattern 28x to finish the repeating pattern 38. The "wrapping" effect of the magnet slot patterns 28 is a result of using one or more substantially similar laminations 22 in the lamination stack defining the rotor core 14, where the laminations 22 are rotated or arcuately offset about the rotation axis "A" by a predetermined amount, as is described further herein.

Figure 6:
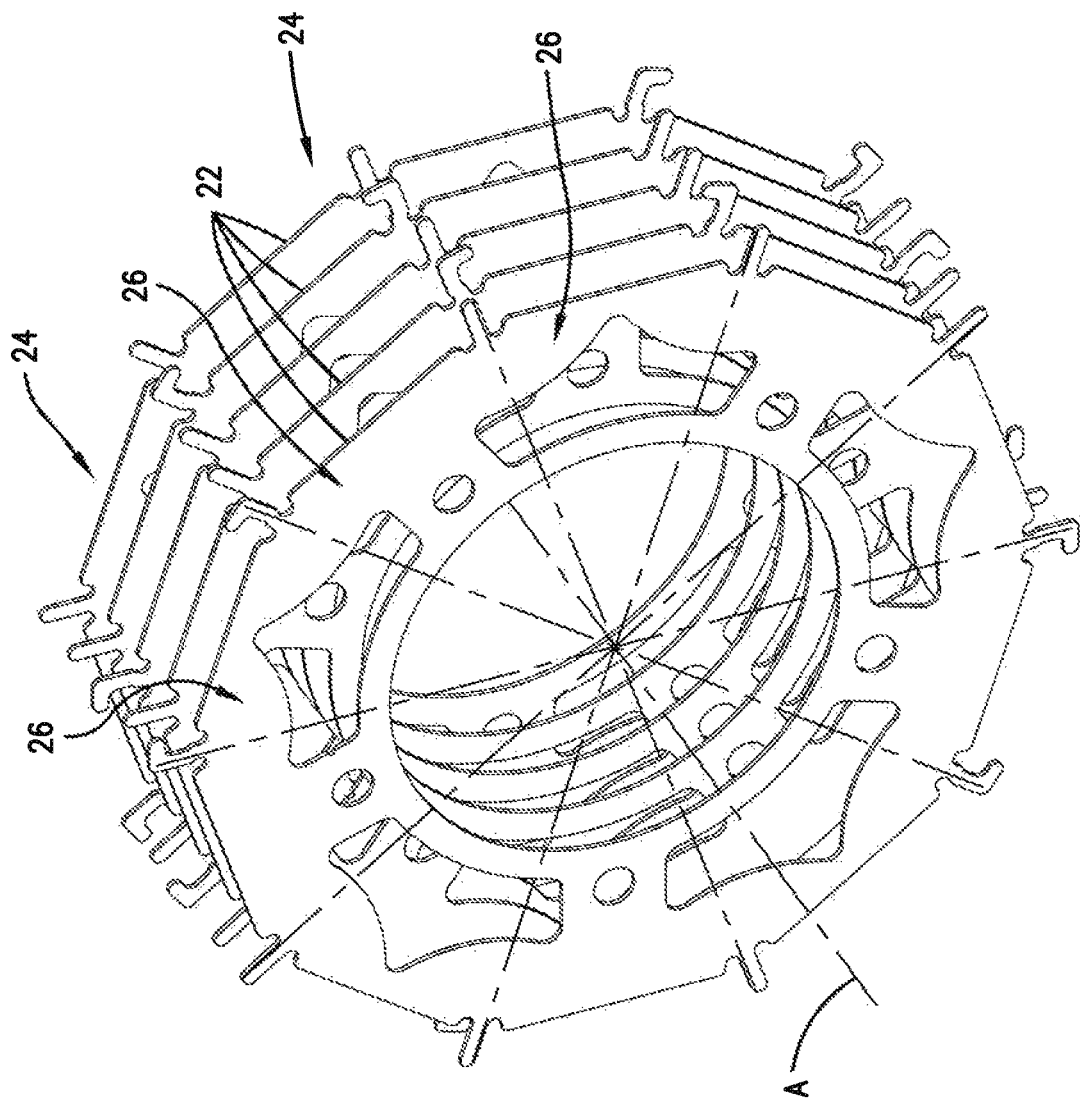
FIG. 6 is a perspective view of a stack of five (5) laminations that define a plurality of repeating patterns of alternating deflectable magnet-retaining prongs and support posts, wherein circumferentially adjacent repeating patterns are axially offset or "wrapped" from one end of the lamination stack to the other.

FIG. 6 is an exploded perspective view of a stack of five (5) laminations 22 that define a plurality of repeating patterns 38, wherein circumferentially adjacent repeating patterns 38 are axially offset or "wrapped" from one end of the lamination stack to the other. As described herein, the exemplary rotor core 14 is a ten (10) pole rotor core. Each lamination 22 shown in FIG. 6 is substantially the same. However, to define the repeating patterns 38 for each magnet slot 24, axially adjacent laminations 22 are rotated in the same direction about the rotation axis "A" an amount equal to two (2) pole sectors 26 relative to adjacent laminations. In other aspects of the present invention, the laminations 22 may be rotated about the rotation axis "A" any alternative amount that enables the rotor core 14 to function as described herein.

Figure 7:
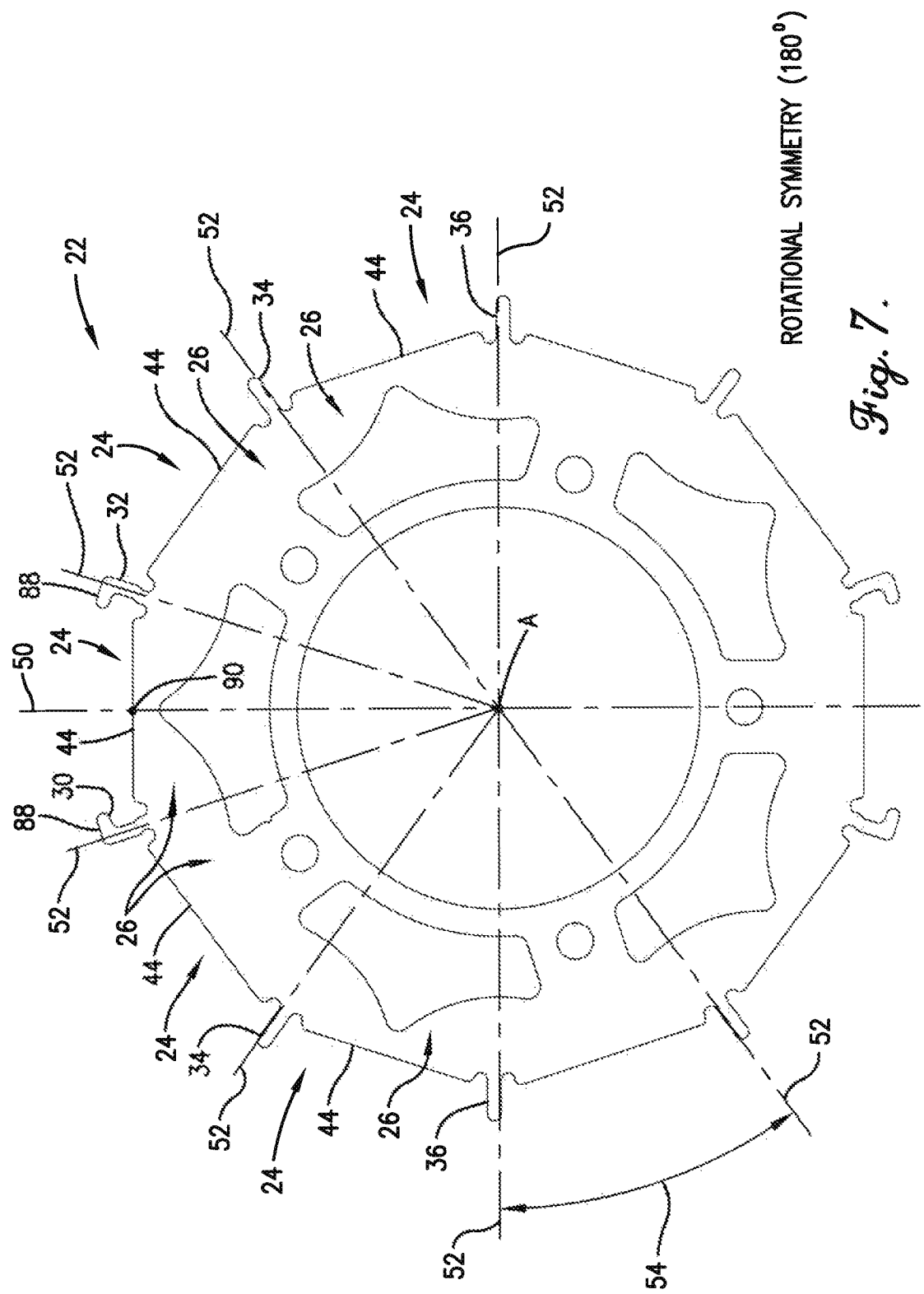
FIG. 7 is a front view of a lamination of the stack of laminations shown in FIG. 6, in accordance with one aspect of the present invention.

FIG. 7 is a front view of a lamination 22, in accordance with one aspect of the present invention. In the exemplary embodiment, the lamination 22 is fabricated with one hundred and eighty degrees (180°) rotational symmetry about the rotation axis (indicated by point "A" in FIG. 7). As described above, the lamination 22 defines ten (10) pole sectors 26. Each of the magnet slots 24 are positioned radially outward from the rotation axis "A" of the rotor core 14, which is shown as the center of the lamination 22. Each magnet slot 24 has a substantially planar magnet surface 44 that is formed substantially perpendicular to a central slot axis 50. The magnet surface 44 defines a slot center point 90 of the magnet slot coincident with the central slot axis 50. A plurality of radial pole pitch lines 52 extend through the center of the lamination 22 (e.g., the rotation axis "A"), with each radial pole pitch line 52 being centered angularly between an adjacent pair of the magnet slots 24 such that each adjacent pair of the magnet slots 24 are disposed symmetrically about the respective radial pole pitch line 52. Each radial pole pitch line 52 defines the boundary between two adjacent pole sectors 26, wherein adjacent radial pole pitch lines 52 define a pole sector 26 therebetween. Each central slot axis 50 passes through the rotation center of the lamination 22 and bisects the respective pole sector 26 (e.g., is angularly centered between adjacent radial pole pitch lines 52). In FIG. 7, only the vertical-most central slot axis 50 is shown for clarity.

As used herein, a pole pitch angle is defined as the angle between identical points on two adjacent pole sectors 26. For example, and without limitation, a pole pitch angle 54 of the lamination 22 is illustrated in FIG. 7 as the angle between adjacent radial pole pitch lines 52, where each central slot axis 50 is positioned between the adjacent radial pole pitch lines 52 at an angle equal to one-half of the pole pitch angle 54. The pole pitch angle is determined by dividing three hundred and sixty degrees (360° (one full turn of the rotor) by the number of pole sectors 26 of the rotor core 14. For example, in the exemplary embodiment, the ten (10) pole rotor core 14 has a pole pitch angle 54 equal to thirty-six degrees (36°), e.g. three hundred and sixty degrees (360°) divided by ten (10) poles.

Figure 8:
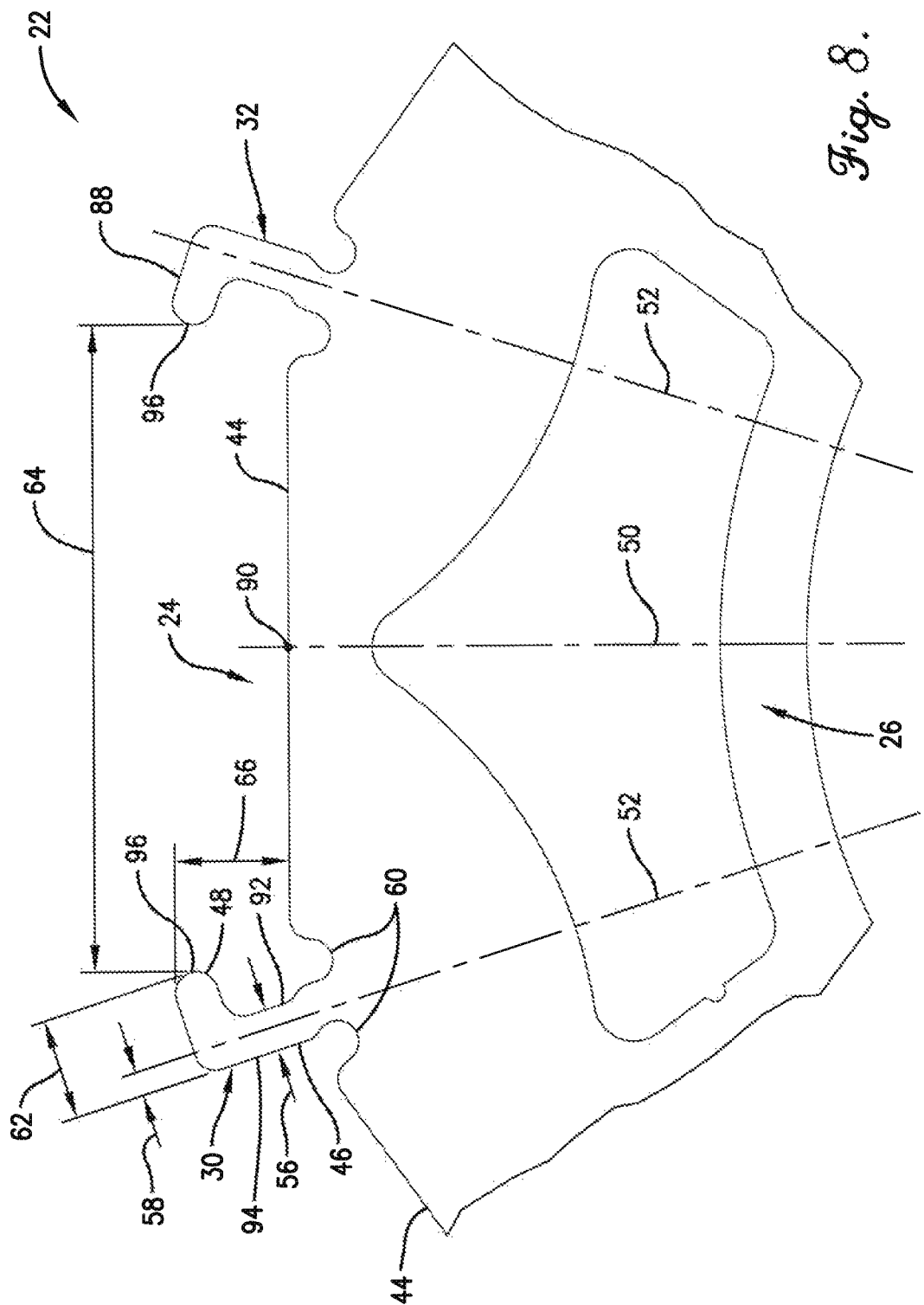
FIG. 8 is an enlarged view of a portion of one of the laminations shown in FIG. 7, illustrating the configuration of the alternating deflectable magnet-retaining prongs with respect to a respective magnet slot and pole sector.

FIG. 8 is an enlarged view of a portion of the lamination 22 shown in FIG. 7, illustrating the configuration of the opposing deflectable magnet-retaining prongs 30 and 32 with respect to a respective magnet slot 24 and pole sector 26. In the exemplary embodiment, the magnet-retaining prongs 30 and 32 are symmetrical with respect to the central slot axis 50 of the pole sector 26. As such, only the details of the magnet-retaining prong 30 will be described.

In the exemplary embodiment, the magnet-retaining prong 30 includes a radially-extending post portion 46 having a width 56 defining radially extending first and second margins 92 and 94 (also referred to as circumferential surfaces) that face in generally arcuately opposite directions. The magnet-retaining prong 30 overlies the pole pitch line 52 of the pole sector 26, with the second margin 94 (e.g., circumferential surface) opposite the magnet slot 24 located a distance 58 from the pole pitch line 52. It is noted that in the exemplary embodiment, the magnet-retaining prong 30 extends substantially radially outward relative to the magnet surface 44 (or what may be considered the main body portion of the lamination 22). In a preferred embodiment of the lamination 22, the width 56 is in a range between and including about one and fifty-five hundredths of a millimeter (1.55 mm) and about one and sixty-five hundredths of a millimeter (1.65 mm). In addition, the preferred distance 58 is in a range between and including about eighty-five hundredths of a millimeter (0.85 mm) and about ninety-five hundredths of a millimeter (0.95 mm). However, in other aspects of the present invention, the width 56 and the distance 58 may include any alternative measures that enable the lamination 22 to function as described herein. The above ranges increase strength and decrease manufacturing costs of the lamination 22.

At a base of the magnet-retaining prong 30, on either side of the magnet-retaining prong 30, relief cuts 60 are defined between the magnet-retaining prong 30 and adjacent planar magnet surfaces 44. In general, the relief cuts 60 operate to reduce stresses in the magnet-retaining prong 30 that may be induced due to twisting of the magnet-retaining prong 30 during insertion of the permanent magnets 16 (shown in FIG. 1). In a preferred embodiment, the relief cuts 60 have a radius in a range between and including about one seventy-five thousandths of a millimeter (0.075 mm) and about eighty-five thousandths of a millimeter (0.085 mm). However, in other aspects of the present invention, the relief cuts 60 may have any alternative radius that enables the lamination 22 to function as described herein.

At a distal end of the post portion 46, the magnet-retaining prong 30 includes a generally arcuately-extending retaining portion 48. The retaining portion 48 extends generally toward the opposite magnet-retaining prong 32. It may also be said that the retaining portion 48 extends from the radially extending first margin 92 of the post portion 46. That is, the retaining portion 48 extends generally inward toward the magnet slot 24 of the respective pole sector 26. In a preferred embodiment of the present invention, the retaining portion 48 is perpendicular to the post portion 46 and has a "tangential" length 62, as measured between the second margin 94 and a tip of the retaining portion 48, that is about three and eight tenths of a millimeter (3.8 mm). However, the "tangential" length 62 is selected such that an overall distance 64 defined between the innermost tips 96 of the retaining portions 48 of the opposed magnet-retaining prongs 30 and 32 is in the range between and including about twenty-four and forty-five hundredths of a millimeter (24.45 mm) and about twenty-four and fifty-five hundredths of a millimeter (24.55 mm), so as to position the respective permanent magnet 16. However, in other aspects of the present invention, the retaining portion 48 may extend arcuately or at an angle other than perpendicular to the post portion 46 and the distance 64 may include any alternative measurement that enables the lamination 22 to function as described herein.

A maximum radial extent of the magnet-retaining prong 30 with respect to the planar magnet surface 44 is defined at a distance 66. The distance 66 is selected to engage with an upper angled side 86 of the permanent magnet 16 (shown in FIG. 10) to exert a reactive force against and secure the magnet 16 in place, while limiting the height of the magnet-retaining prong 30 to a distance less than an outer radius of the magnet 16, as will be described herein. In a preferred embodiment, the distance 66 is in a range between and including about three and fifty-two hundredths of a millimeter (3.52 mm) and about three and sixty-two hundredths of a millimeter (3.62 mm). However, in other aspects of the present invention, the distance 66 may be any alternative distance that enables the lamination 22 to function described herein.

Figure 9:
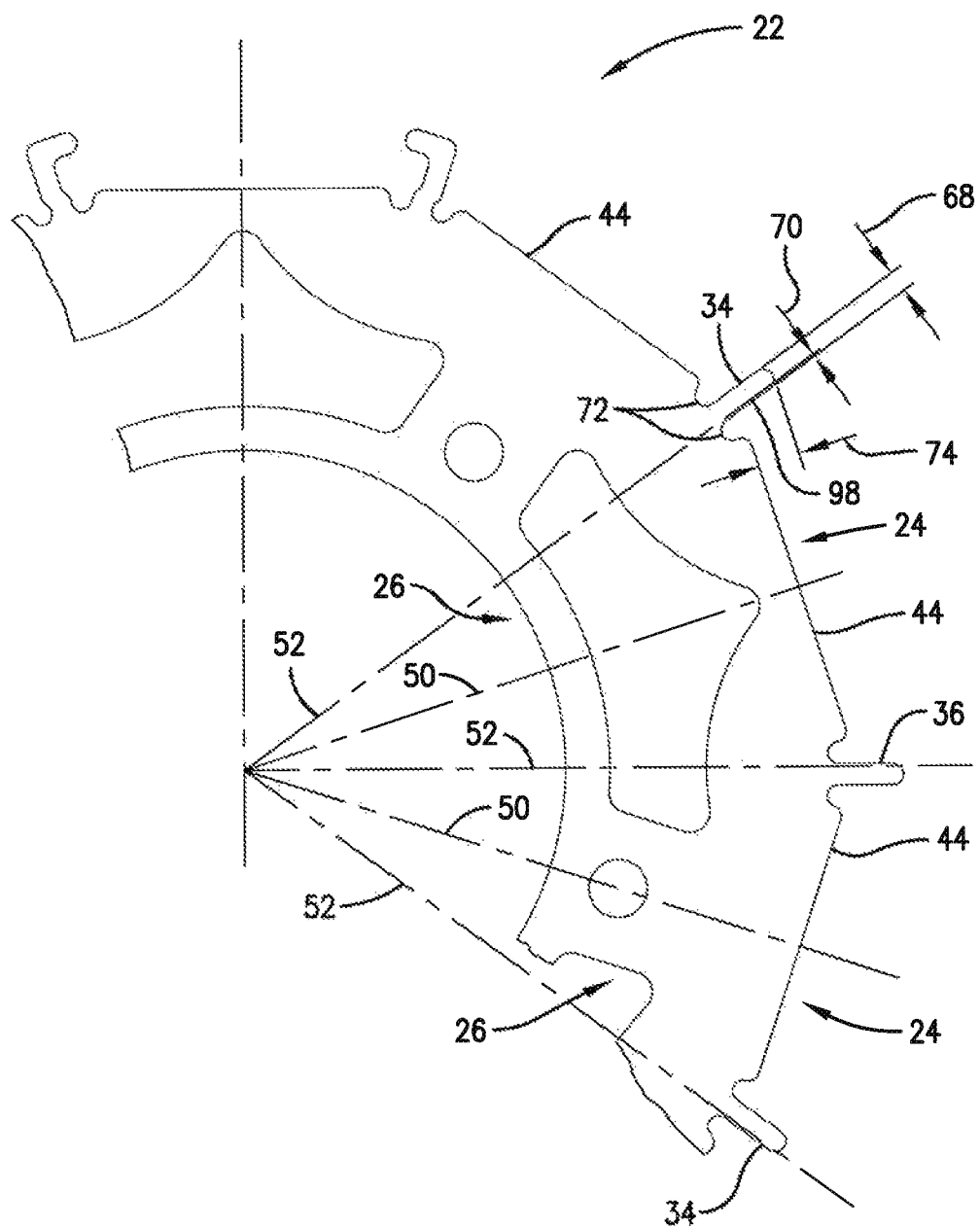
FIG. 9 is an enlarged view of a portion of one of the laminations shown in FIG. 7, illustrating the configuration of the support posts with respect to a respective magnet slot and adjacent pole sectors.

FIG. 9 is an enlarged view of a portion of the lamination 22 shown in FIG. 7, illustrating the configuration of the support posts 34 and 36 with respect to a respective magnet slot 24 and adjacent pole sectors 26. In the exemplary embodiment, the support posts 34 and 36 are symmetrical with respect to the central slot axis 50 of the respective pole sector 26. As such, only the details of the support post 34 will be described.

In the exemplary embodiment, the support post 34 extends substantially radially outward relative to the magnet surface 44 (or the main body portion of the lamination 22) and has a width 68. The support post 34 overlies the pole pitch line 52 of the pole sector 26, with a radially-extending margin 98 (also referred to as a circumferential surface) adjacent the magnet slot 24 located a distance 70 from the pole pitch line 52. In a preferred embodiment of the lamination 22, the width 68 and the distance 70 are selected such that the support post 34 has about 83.8% to about 91% of its width positioned outside the pole sector 26. In such a preferred embodiment, the width 68 is substantially similar to the width 56 of the post portion 46 of the magnet-retaining prongs 30 and 32. As such, the width 68 is in a range between and including about one and fifty-five hundredths of a millimeter (1.55 mm) and about one and sixty-five hundredths of a millimeter (1.65 mm). In addition, the distance 70 is in a range between and including about fifteen hundredths of a millimeter (0.15 mm) and about twenty-five hundredths of a millimeter (0.25 mm). However, in other aspects of the present invention, the width 68 and the distance 70 may include any alternative measures that enable the lamination 22 to function as described herein. The above ranges increase strength and decrease manufacturing costs of the lamination 22.

At a base of the support post 34, on either side of the support post 34, relief cuts 72 are defined between the support post 34 and adjacent planar magnet surfaces 44. In general, the relief cuts 72 operate to reduce stresses in the support post 34 that may be induced due to loads imparted on the support post 34 (likely by the adjacent magnet-retaining prong 32) during insertion and retention of the permanent magnets 16 (shown in FIG. 1). In a preferred embodiment, the relief cuts 72 have a radius in a range between and including about one seventy-five thousandths of a millimeter (0.075 mm) and about eighty-five thousandths of a millimeter (0.085 mm). However, in other aspects of the present invention, the relief cuts 60 may have any alternative radius that enables the lamination 22 to function as described herein.

A maximum radial extent of the support post 34 with respect to the planar magnet surface 44 is defined at a distance 74. The distance 74 is selected to provide sufficient length to the support post 34 to support an adjacent magnet-retaining prong 30 or 32 against bending, while limiting the height of the support post 34 to a distance less than an outer radius of the magnet 16, as will be described herein. In a preferred embodiment, the distance 74 is in a range between and including about two and seventy hundredths of a millimeter (2.70 mm) and about two and eighty hundredths of a millimeter (2.80 mm). However, in other aspects of the present invention, the distance 74 may be any alternative distance that enables the lamination 22 to function described herein.

Figure 10:
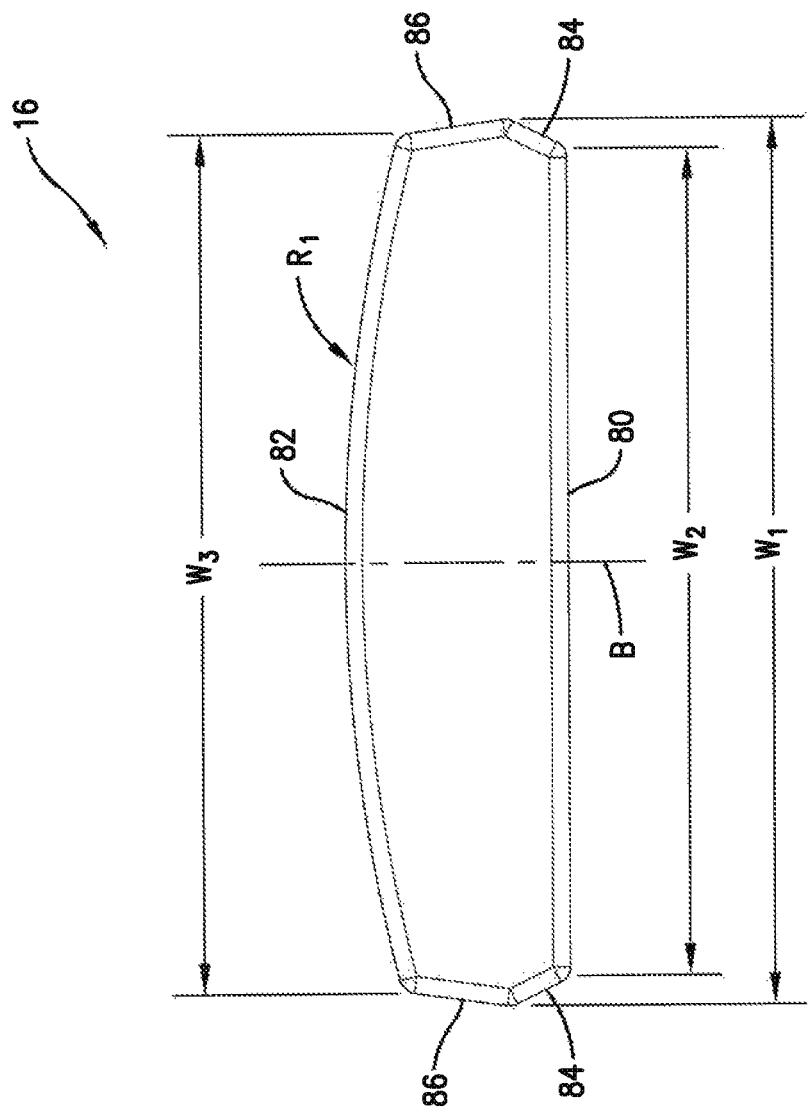
FIG. 10 is a front view of an exemplary permanent magnet shown in FIGS. 1 and 2, in accordance with one aspect of the present invention.

FIG. 10 is a front view of an exemplary permanent magnet 16, in accordance with one aspect of the present invention. In the exemplary embodiment, the magnet 16 is fabricated from any material that produces a magnet field and may be configured to match forms associated with the magnet slots 24 defined by the lamination 22. As shown in FIG. 10, the magnet 16 is substantially symmetrical about a midline "B" and has a substantially flat bottom 80 and an arcuate opposite top 82. In the exemplary embodiment, the arcuate top 82 has a radius $R_1$ that has its center point coincident with the rotation axis "A" of the rotor core 14. In a preferred embodiment, the radius $R_1$ is in a range between and including about forty-nine and fifty-seven hundredths of a millimeter (49.57 mm) and about forty-nine and sixty-seven hundredths of a millimeter (49.67 mm). However, in other aspects of the present invention, the radius $R_1$ may have any alternative value that enables the magnet 16 to function as described herein.

The magnet 16 has an overall width $W_1$ that is configured to fit within a magnet slot 24 defined by the rotor core 14. In addition, the magnet 16 includes a pair of lower angled sides 84 and a pair of upper angled sides 86, such that a second width $W_2$ between ends of the lower angled sides 84 and a third width W3 between ends of the upper angled sides 86 is less than the overall width $W_1$. While the exemplary magnet 16 is shown with a curved top 82 and a flat bottom 80, in other aspects of the present invention, the magnet 16 may have alternative forms as dictated by design requirements. For example, and without limitation, the form of the magnets 16 may be determined based on various design requirements including, for example, cogging, torque ripple, and other desired operating considerations.

As described herein, the magnet 16 may be configured such that the radius $R_1$ results in the top 82 extending radially outward of the deflectable magnet-retaining prongs 30 and 32 and the support posts 34 and 36 upon insertion of magnets 16 into the rotor core 14. This has the advantage of facilitating improved torque ripple and torque efficiency.

It is noted that the angles discussed above, such as the pole pitch angles 54, are geometric and are expressed as mechanical degrees. For the design of electric motors, electrical degrees are also employed so that results can be generalized. It is noted that each pole pitch angle 54 (or pole sector 26) of the rotor assembly 10 is equal to one-hundred and eighty electrical degrees (180° electrical), as the magnetic poles are one-hundred and eighty electrical degrees (180° electrical) apart.

In operation, the rotor assembly 10 is assembled by first fabricating a plurality of laminations 22. As described above, the laminations 22 may be fabricated from a suitable sheet material, including, for example, and without limitation, a magnetically permeable material, such as iron, a steel, or a steel alloy, by punching, stamping, machining, and/or using other suitable lamination forming techniques. Following fabrication of the laminations 22, the laminations 22 are oriented as described herein.

Figure 11:
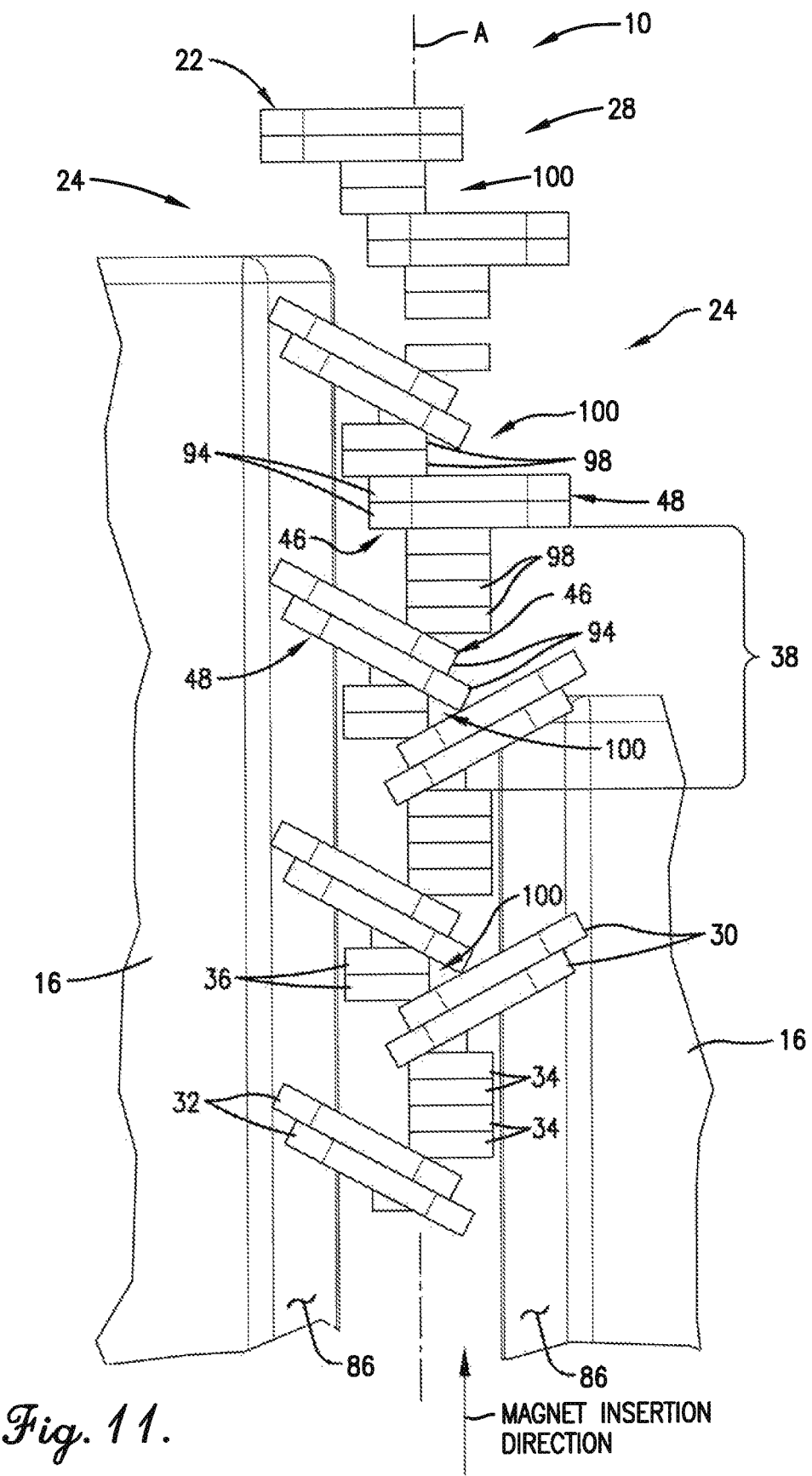
FIG. 11 is an enlarged view of a portion of the rotor core shown in FIG. 2, illustrating the deflection of the magnet slot pattern shown in FIG. 4 as the permanent magnets are inserted during assembly.

FIG. 11 is an enlarged view of a portion of the rotor core 14 shown in FIG. 2, illustrating the deflection of the magnet slot pattern 28, and more particularly, of the alternating deflectable magnet-retaining prongs 30 and 32 and support posts 34 and 36, as the permanent magnets 16 are inserted during assembly. In the exemplary embodiment, a stack of ten (10) laminations 22 is provided. The laminations 22 are placed in face-to-face contact with each other, where each lamination 22 presents opposite axial faces. Each subsequent pair of laminations 22 in the stack of ten (10) laminations is rotated or arcuately offset about the rotation axis "A" an amount equal to at least two pole pitch angles 54 with respect to the adjacent, previous pair of laminations 22. As such, this enables the stack of ten (10) laminations to form the repeating pattern 38 of the deflectable magnet-retaining prongs 30 and 32 and the support posts 34 and 36.

The support posts 34 and 36, and in particular, the radially-extending margins 98 of the support posts 34 and 36, are spaced from the second margin 94 of the respective magnet-retaining prongs 30 and 32, such that the post portion 46 partially overlaps and is partly unsupported by the respective support post 34 or 36. That is, each of the support posts 34 and 36 extend arcuately beyond the second margin 94 of the post portions 46 of the respective magnet-retaining prongs 30 and 32. The rotor core 14 may include a plurality of these ten (10) laminations stacks, each being oriented the same as a previous stack, to define an axial length of the rotor core 14. However, in other aspects of the present invention, the lamination stack defining the repeating patterns 38 may be formed by stacking and orienting single laminations 22 or groups of three (3) or more laminations 22, as described herein. For example, every other lamination 22 or three (3) laminations 22 may be rotated or arcuately offset about the rotation axis "A" an amount equal to at least two pole pitch angles 54 with respect to the adjacent, previous lamination or group of laminations.

At least one permanent magnet 16 is inserted into each magnet slot 24 in a first axial direction as indicated. For example, and without limitation, the magnets 16 are each pressed axially into a respective magnet slot 24. It is noted that the magnets 16 may be pressed individually into the magnet slots 24 or may be pressed in multiples, up to and including, simultaneous pressing of all the magnets 16 into the magnet slots 24. As a magnet 16 is pressed into a respective magnet slot 24, the retaining portions 48 of the magnet-retaining prongs 30 and 32 contact the upper angled sides 86 of the magnets 16, causing the magnet-retaining prongs 30 and 32 to deflect or twist, for example, generally about the radial pole pitch line 52 (shown in FIG. 8) in the first axial direction. The support posts 34 and 36 provide support to the magnet-retaining prongs 30 and 32 to facilitate limiting or controlling axial bending of the magnet-retaining prongs 30 and 32. The twisting of the magnet-retaining prongs 30 and 32 provides a reactive force against the magnets 16, and in particular, the upper angled sides 86 of the magnets, to hold the magnets 16 in place. In addition to providing support to the magnet-retaining prongs 30 and 32, the support posts 34 and 36 also provide an axial gap 100 (or axial space) between the serially spaced magnet-retaining prongs 30 and 32. This enables the magnet-retaining prongs 30 and 32 to deflect or twist a predetermined amount without interfering with each other.

Figure 12:
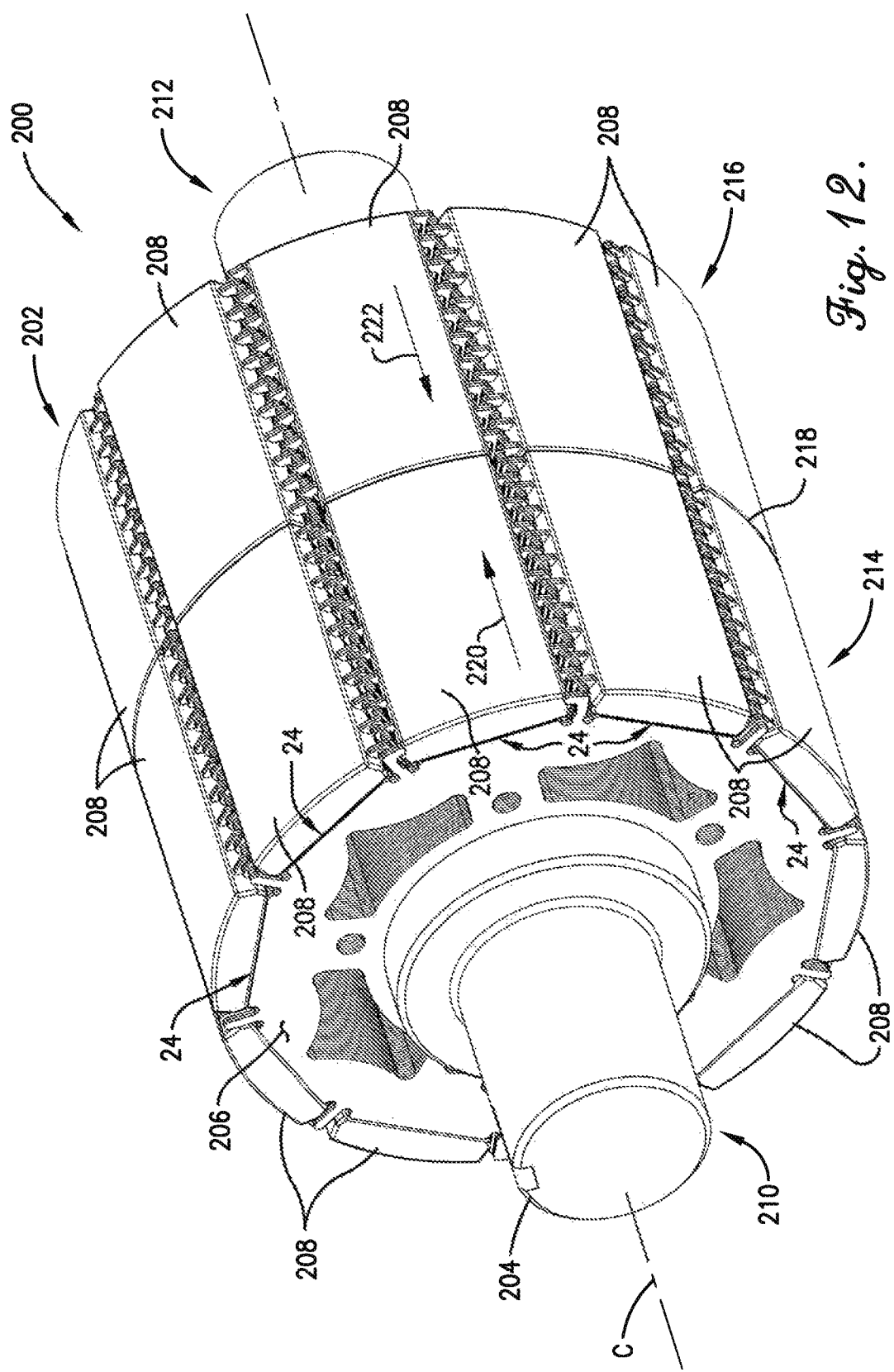
FIG. 12 is a perspective view of an alternative rotor assembly of an electric motor, in accordance with another aspect of the present invention.

FIG. 12 is a perspective view of an alternative rotor assembly 202 of an electric motor 200, in accordance with another aspect of the present invention. In the exemplary embodiment, the rotor assembly 202 is illustrated as a brushless permanent magnet rotor assembly for use with an inner rotor electric motor, such as the electric motor 200. However, according to other aspects of the present invention, the rotor assembly 202 may alternately be constructed as an outer rotor assembly for use with an outer rotor motor and/or a dual rotor motor. In addition, the rotor assembly 202 may be constructed for use in an electric generator or other electric machine that comprises a stator.

As shown in FIG. 12, the illustrated rotor assembly 202 preferably includes a rotor shaft 204 fixedly supporting a rotor core 206. In one suitable embodiment, the rotor shaft 204 extends axially through the rotor core 206 and defines a rotation axis "C" of the rotor assembly 202. The rotor assembly 202 is substantially cylindrical in shape having an outside nominal diameter that is smaller than an inside diameter of an inner surface of the stator assembly (not shown) to enable rotation therein. As described herein, the rotor core 206 of the rotor assembly 202 is a permanent-magnet rotor core and includes a plurality of permanent magnets 208. It is noted that in one suitable embodiment, the permanent magnets 208 are substantially similar in cross-sectional shape to the permanent magnets 16. In the exemplary embodiment, the rotor shaft 204 is fixedly coupled to the rotor core 206 and positioned concentrically relative thereto. The rotor shaft 204 includes a first axial end 210 that extends forward from the rotor core 206 and a second axial end 212 that extends rearward from the rotor core 206. In the illustrated embodiment, the rotor core 206 and the magnets 208 are rigidly coupled together and are configured to rotate with the rotor shaft 204.

The rotor core 206 is fabricated from a plurality of the laminations 22, described herein with respect to the rotor core 14 shown in FIG. 3. In the illustrated embodiment, however, the rotor core 206 includes a first set of laminations 214 and an axially-adjacent second set of laminations 216. The first and second sets of laminations 214 and 216 form an axially-continuous rotor core and are substantially the same in axial length (e.g., each containing the same number of laminations 22). However, in alternative aspects of the present invention, the first and second sets of laminations 214 and 216 can have any axial length (including different axial lengths) that enables the rotor core 206 to function as described herein.

Each lamination 22 of the first set of laminations 214 is rotated or arcuately offset from an adjacent lamination 22 in a first direction about the rotation axis "C." In addition, each lamination 22 of the second set of laminations 216 is rotated or arcuately offset from an adjacent lamination 22 in a second, or opposite, direction about the rotation axis "C." As such, the first set of laminations 214 defines a plurality of first magnet slot patterns of alternating deflectable magnet-retaining prongs 30 and 32 and support posts 34 and 36 that are substantially similar to the magnet slot pattern 28 shown in FIG. 4. The second set of laminations 216 defines a plurality of second magnet slot patterns of alternating deflectable magnet-retaining prongs 30 and 32 and support posts 34 and 36 that are symmetrical to or mirrors the first magnet slot patterns of the first set of laminations 214. For example, and without limitation, the first and second magnet slot patterns are mirrored about a plane that is perpendicular to the rotation axis "C" and positioned between the first and second sets of laminations 214 and 216, indicated by the axial interface 218 between adjacent magnets 208.

At least one permanent magnet 208 is inserted into each magnet slot 24 of the first set of laminations 214 in a first axial direction, as indicated by arrow 220. For example, and without limitation, the magnets 208 are each pressed axially into a respective magnet slot 24. It is noted that the magnets 208 may be pressed individually into the magnet slots 24 or may be pressed in multiples, up to and including, simultaneous pressing of all the magnets 208 into the magnet slots 24. As a magnet 208 is pressed into a respective magnet slot 24, the retaining portions 48 of the magnet-retaining prongs 30 and 32 contact the upper angled sides of the magnets 208, causing the magnet-retaining prongs 30 and 32 to deflect or twist.

In addition, at least one permanent magnet 208 is inserted into each magnet slot 24 of the second set of laminations 216 in a second axial direction, as indicated by arrow 222. For example, and without limitation, the magnets 208 are each pressed axially into a respective magnet slot 24. The magnets 208 may be pressed individually into the magnet slots 24 or may be pressed in multiples, up to and including, simultaneous pressing of all the magnets 208 into the magnet slots 24. As a magnet 208 is pressed into a respective magnet slot 24, the retaining portions 48 of the magnet-retaining prongs 30 and 32 contact the upper angled sides of the magnets 208, causing the magnet-retaining prongs 30 and 32 to deflect or twist. The magnets 208 of the first set of laminations 214 and the second set of laminations 216 are pressed axially along a length of the respective set of laminations 214 or 216 such that magnets in a respective magnet sot 24 contact each other in face-to-face contact at the interface of the first and second sets of laminations 214 and 216, indicated by the axial interface 218.

Advantageously, embodiments of the present invention address the susceptibility of known magnet-retaining techniques to manufacturing tolerances by increasing the amount of twisting that can be allowed for each retaining portion of the magnet-retaining prongs within a limited design space. By increasing the allowed twist, variations due to manufacturing tolerances result in less variation in magnet insertion force, magnet retention force, and lamination material stress. This results in increasing the manufacturability while decreasing the manufacturing cost of the disclosed rotor assemblies by reducing the demand of manufacturing tolerances and increasing the margin-for-error of newly designed rotor assemblies. Another advantage of the present invention is that the overall time to market for a new rotor assembly design may also be reduced. A further advantage of the present invention is that the total force required to install the magnets is reduced, which makes the rotor easier to assemble and reduces the risk of damage to tooling or components.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The invention claimed is:

1. A rotor assembly for an electric machine, said rotor assembly comprising:
    a rotor core including a plurality of laminations stacked along a rotational axis of the electric machine,
    said rotor core defining a plurality of arcuately arranged, axially extending magnet-receiving slots,
    said rotor core including a plurality of magnets received in respective magnet-receiving slots,
    said laminations including opposed first and second deflectable magnet-retaining prongs that extend into a corresponding one of the magnet-receiving slots,
    said magnet-retaining prongs engaging and being deflected by a corresponding one of the magnets to exert a reactive force against the corresponding one of the magnets therebetween,
    said laminations including first and second support posts axially adjacent the first and second magnet-retaining prongs, respectively,
    said first and second support posts having a constant width and being free from contact with and spaced from the plurality of magnets,
    each of said support posts extending alongside and thereby limiting deflection of the respective magnet-retaining prong when engaged with the corresponding one of the magnets.

2. The rotor assembly as claimed in claim 1,
    said plurality of laminations comprising a first set of laminations and a second set of laminations,
    each of said first and second sets of laminations continuously stacked along a rotational axis of the electric machine and defining an interface therebetween,
    said second set of laminations being symmetrical to said first set of laminations with respect to the interface.

3. The rotor assembly as claimed in claim 2,
    each lamination of said first set of laminations being arcuately offset in a first rotational direction relative to at least one other lamination of said first set of laminations,
    each lamination of said second set of laminations being arcuately offset in a second rotational direction relative to at least one other lamination of said second set of laminations.

4. The rotor assembly as claimed in claim 3,
    each of said magnet-retaining prongs including a post portion that extends generally radially relative to the rotational axis,
    each of said magnet-retaining prongs including a retaining portion that projects in a generally arcuate direction from the post portion, with the retaining portions of the first and second magnet-retaining prongs extending toward one another.

5. The rotor assembly as claimed in claim 4,
    said plurality of magnets comprising a first plurality of magnets and a second plurality of magnets,
    each magnet of the first plurality of magnets being axially inserted into the respective magnet-receiving slot of the first set of laminations in a first axial direction,
    each magnet of the second plurality of magnets being axially inserted into the respective magnet-receiving slot of the second set of laminations in a second axial direction,
    each magnet of the first plurality of magnets contacting a respective magnet of the second plurality of magnets in face-to-face contact at the interface.

6. The rotor assembly as claimed in claim 1,
    each of said laminations comprising a plurality of rotor pole sectors, each of which has a first radial pole pitch line and an arcuately-spaced second radial pole pitch line cooperatively defining therebetween a pole pitch angle,
    each of said rotor pole sectors having a respective central slot axis bisecting the pole pitch angle.

7. The rotor assembly as claimed in claim 6,
    said rotor pole sectors including a first rotor pole sector including the first and second magnet-retaining prongs,
    each of said magnet-retaining prongs including a post portion that extends generally radially relative to the rotational axis, said post portion being substantially parallel to and overlapping a respective one of the first and second radial pole pitch lines of the first rotor pole sector, each of said magnet-retaining prongs including a retaining portion that projects in a generally arcuate direction from the post portion, with the retaining portions of the first and second magnet-retaining prongs extending toward one another.

8. The rotor assembly as claimed in claim 7, said rotor pole sectors including a second rotor pole sector adjacent the first rotor pole sector, with the first and second rotor pole sectors sharing a common radial pole pitch line, said second rotor pole sector including one of the support posts that is substantially parallel to and overlapping the other radial pole pitch line of the second rotor pole sector.

9. The rotor assembly as claimed in claim 8, said laminations being identical.

10. The rotor assembly as claimed in claim 9, each lamination of said plurality of laminations being arcuately offset an equal amount in a first rotational direction relative to an axially adjacent lamination.

11. The rotor assembly as claimed in claim 1, each of said magnet-retaining prongs including a post portion that extends generally radially relative to the rotational axis, each of said magnet-retaining prongs including a retaining portion that projects in a generally arcuate direction from the post portion, with the retaining portions of the first and second magnet-retaining prongs extending toward one another.

12. The rotor assembly as claimed in claim 11, each of said magnet-receiving slots defining an arcuate slot center point and a central slot axis that extends radially relative to the rotational axis through the slot center point, said first and second magnet-retaining prongs being symmetrical to each other with respect to the central slot axis of the corresponding one of the magnet-receiving slots.

13. The rotor assembly as claimed in claim 11, each of said magnets being axially inserted into the respective magnet-receiving slot in a first axial direction, each of said magnet-retaining prongs presenting opposite axial faces, with one of the faces facing the first axial direction, each of said magnet-retaining prongs being configured so that the retaining portion engages the corresponding one of the magnets and is thereby deflected in the first axial direction when the corresponding one of the magnets is inserted in the first axial direction.

14. The rotor assembly as claimed in claim 13, each of said support posts engaging the respective magnet-retaining prong along said one of the faces.

15. The rotor assembly as claimed in claim 14, said retaining portion projecting from the post portion at a location spaced a radial distance from the rotational axis, each of said support posts presenting a radially outermost distal post end, said distal post end being spaced from the rotational axis at least the radial distance.

16. The rotor assembly as claimed in claim 15, said post portion of each magnet-retaining prong presenting a radially outermost distal prong end, said distal prong end and said distal post end being at least substantially radially aligned.

17. The rotor assembly as claimed in claim 16, said laminations being identical.

18. The rotor assembly as claimed in claim 17, each lamination of said plurality of laminations being arcuately offset an equal amount in a first rotational direction relative to an axially adjacent lamination.

19. A rotor assembly for an electric machine, said rotor assembly comprising:

a rotor core including a plurality of laminations stacked along a rotational axis of the electric machine, said rotor core defining a plurality of arcuately arranged, axially extending magnet-receiving slots, said rotor core including a plurality of magnets received in respective magnet-receiving slots, said laminations including opposed first and second deflectable magnet-retaining prongs that extend into a corresponding one of the magnet-receiving slots, said magnet-retaining prongs engaging and being deflected by a corresponding one of the magnets to exert a reactive force against the corresponding one of the magnets therebetween, said laminations including first and second support posts axially adjacent the first and second magnet-retaining prongs, respectively, said first and second support posts having a constant width and being spaced from the plurality of magnets, each of said support posts extending alongside and thereby limiting deflection of the respective magnet-retaining prong when engaged with the corresponding one of the magnets, each of said laminations including the first magnet-retaining prong and the second magnet-retaining prong associated with a first one of the magnet-receiving slots, and the first support post and the second support post associated with a second one of the magnet-receiving slots, each of said laminations being arcuately offset an equal amount in a first rotational direction relative to an axially adjacent lamination.

20. The rotor assembly as claimed in claim 19, said laminations being identical.

* * * * *